Feb. 6, 1934.                G. A. MITCHELL              1,945,863
                    DUPLEX MOTION PICTURE PROJECTOR
                  Filed July 21, 1930        4 Sheets-Sheet 1

Inventor
George A. Mitchell
Attorney.

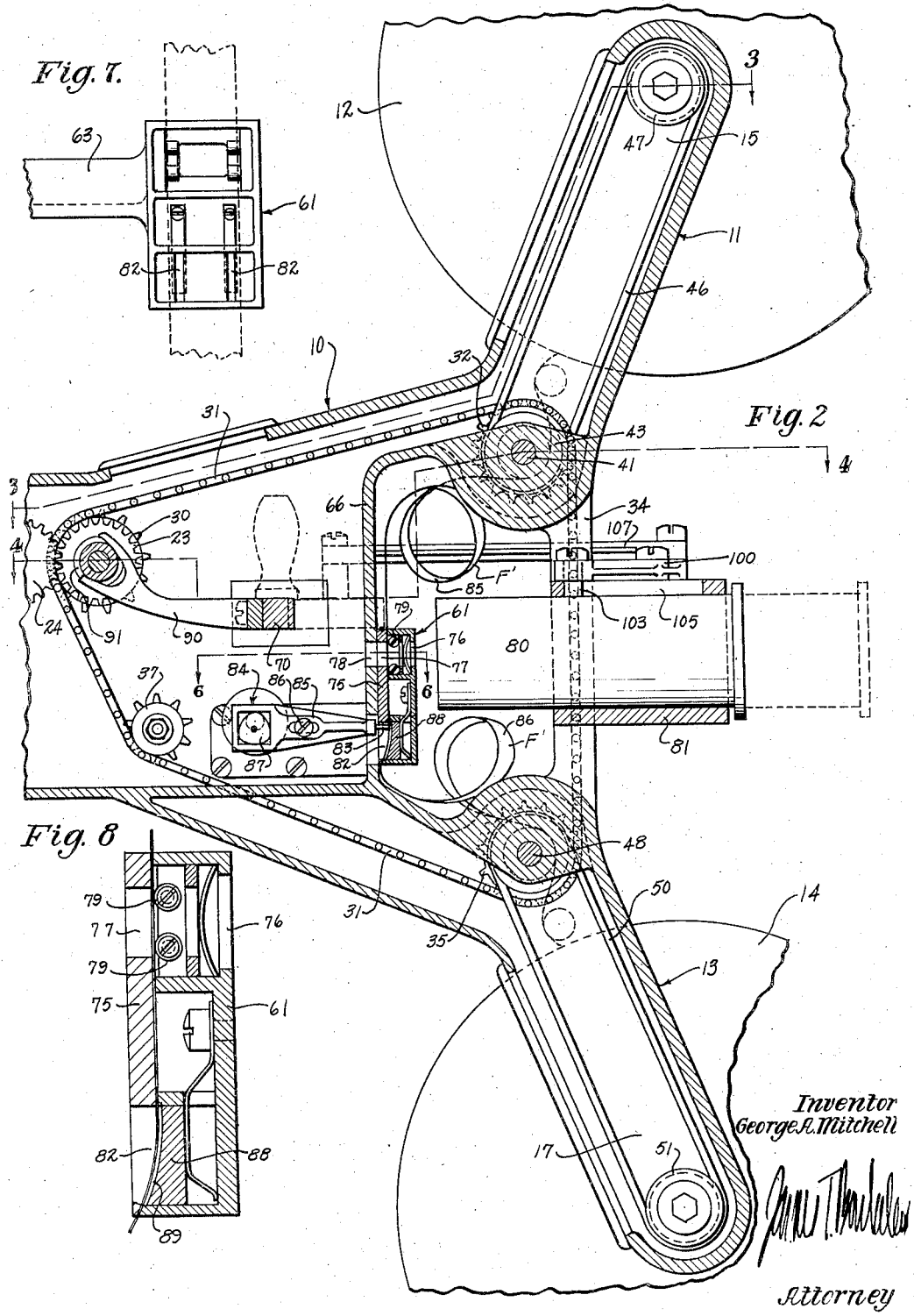

Feb. 6, 1934.    G. A. MITCHELL    1,945,863
DUPLEX MOTION PICTURE PROJECTOR
Filed July 21, 1930    4 Sheets-Sheet 3

Inventor
George A. Mitchell.

Attorney.

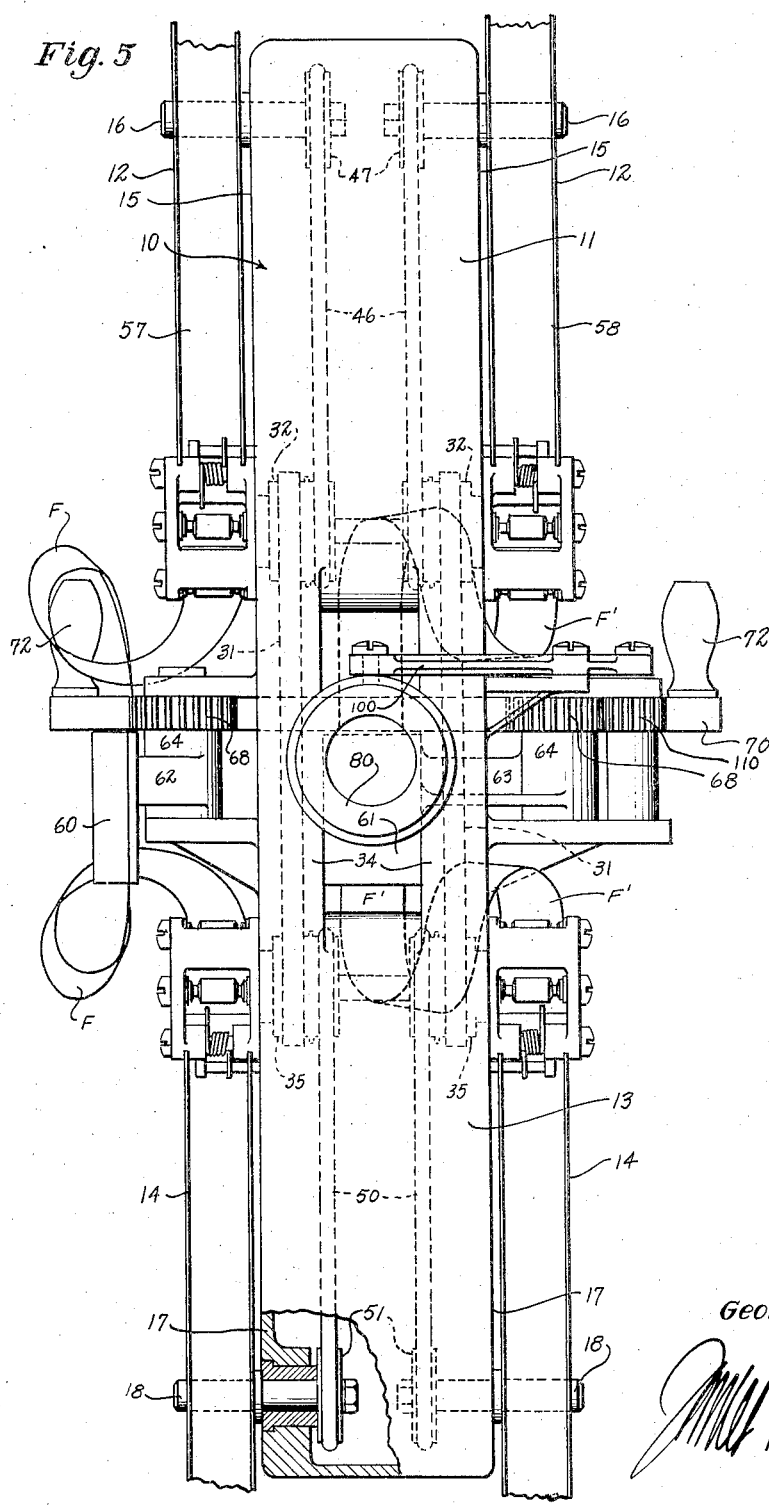

Patented Feb. 6, 1934

1,945,863

UNITED STATES PATENT OFFICE 1,945,863

DUPLEX MOTION PICTURE PROJECTOR

George A. Mitchell, Los Angeles, Calif., assignor to Mitchell Camera Corporation, West Hollywood, Calif., a corporation of Delaware Application July 21, 1930. Serial No. 469,567

23 Claims. (Cl. 88—17)

This invention relates generally to motion picture projectors, and it is a general object of the invention to provide a single projection machine adapted to carry two reels of film and having transfer mechanism for changing over from one film to the other without substantially interrupting the continuity of projection.

In large motion picture theatres it is common to achieve continuity of projection by providing a plurality of projectors, and when the film reel on one projector is finished that projector is stopped and another projector having the next reel is simultaneously started. According to this practice, however, at least two complete projectors are required, which practice is not suited either to small motion picture theatres or to the home. In all such situations in which the provision of but a single projector is practicable, it is necessary whenever a reel is to be changed to interrupt projection while the old film is removed and the new one is threaded. The disadvantages of this practice are self-evident.

I have accordingly provided a single machine having feed and take-up reels for each of two films, and having means for quickly changing from the projection of one film to the projection of the other, all without stopping to thread film, and without stopping the intermittent film movement mechanism, and with but a slight interruption in projection. In accomplishing this purpose I have provided, in my preferred embodiment, a machine having feed and take-up reels for two films, and with individual driving sprockets for each film. The film passes down through individual film gates, each of which is movable to and from a common projection position. A single intermittent film movement is provided at the projection position for driving whichever of the two films is held by its gate at that position. Means are then provided whereby the film moving sprockets and reels of the film which is at the projection position are connected to the projector drive, while the film moving sprockets and reels of the other film are disconnected. Accordingly, while one reel of film is being projected another may be threaded on the machine, and when the first is finished the machine may be operated to remove that film from the projection position and to replace it with the second film, while simultaneously changing the drive from the first film to the second, so that but a moment's time is required for the transfer.

The details of how these ends are accomplished will be more fully understood from the following detailed description of a present preferred embodiment of the invention, reference for this purpose being had to the accompanying drawings, in which:

Fig. 2 is a longitudinal medial section of the projector, being in section taken as indicated by line 2—2 of Fig. 3;

Fig. 5 is a front elevation of the projector;

Fig. 7 is a fragmentary detail of the film arm and gate with the plate removed; and Fig. 8 is a vertical cross section of the film gate.

Certain parts of the projector usual and well known in the art, such as the shutter, lamp house, projection lens, film take-up provisions, etc., are not herein referred to, as these may be of any well known form and may be incorporated in a design with my projector in any suitable manner.

Figure 3:
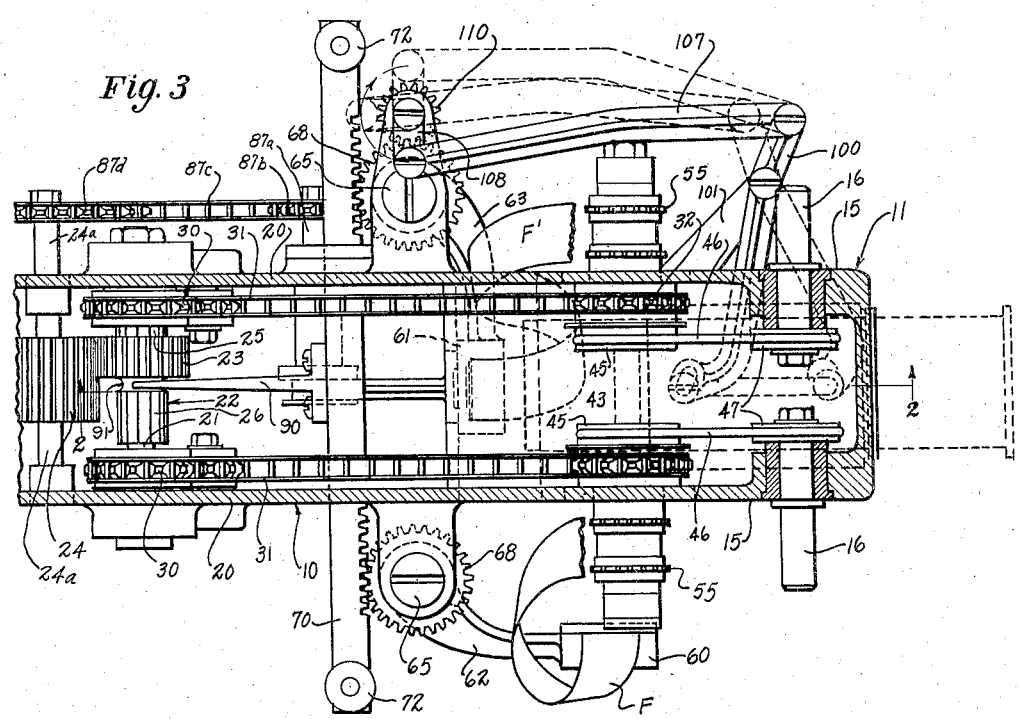
Fig. 3 is a section taken as indicated by the broken line 3—3 of Fig. 2.

In the drawings the numeral 10 indicates generally a hollow body frame for the projector, which frame may be supported by any suitable standard, not shown. The forward portion of body 10 is formed with a hollow upwardly extending arm 11 for the mounting of the two feed reels 12, and with a hollow downwardly extending arm 13 for the mounting of the two take-up reels 14. Journaled at the upper end of arm 11 in the two side walls 15 thereof are spindles 16 upon the outer ends of which are removably mounted the feed reels 12, as clearly shown in Fig. 3. The side walls 17 of the downwardly extending arm 13 similarly carry mounting spindles 18 for the take-up reels 14.

Figure 4:
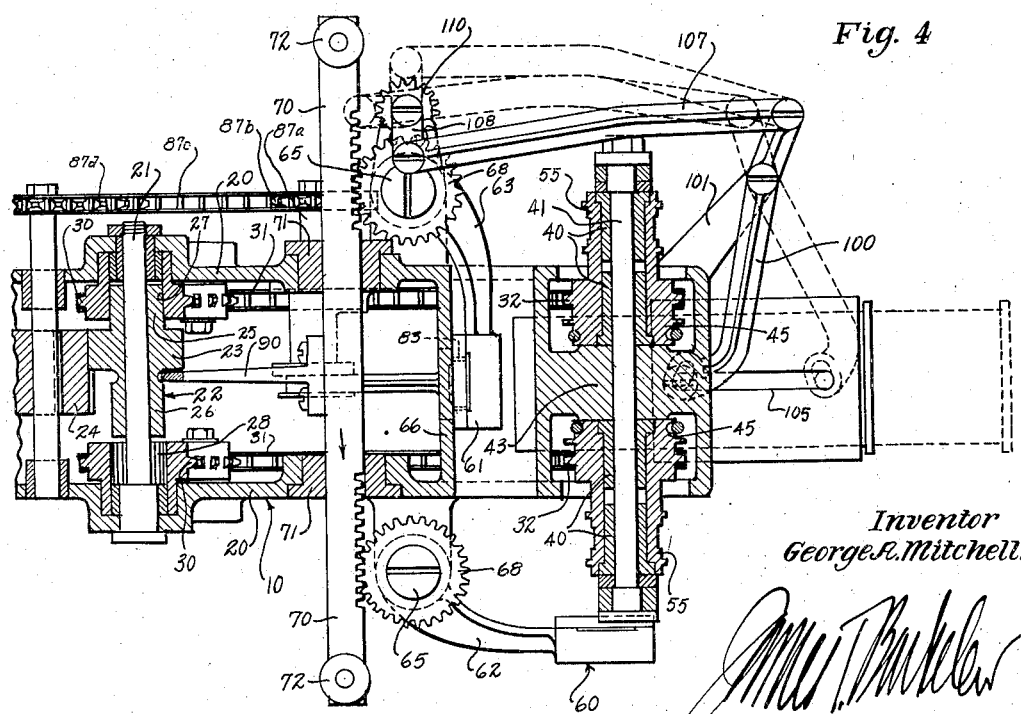
Fig. 4 is a section as indicated by the broken line 4—4 of Fig. 2.

Mounted horizontally in the side walls 20 of the projector body at the rear thereof is a horizontal transverse shaft 21, and rotatable and longitudinally slidable thereon between walls 20 is a shiftable transmission member 22. This transmission member 22 has a medial spur gear 23, which meshes with a driving gear 24 mounted on a shaft 24a journaled in the side walls of the frame. Shaft 24a may be considered as the drive shaft of the projector, it being understood to be driven in any suitable manner, not shown. On the two sides of gear 23 are internal clutch members 25 and 26, while rotatably mounted on the two ends of shaft 21 within the side walls 20 are the corresponding external clutch elements 27 and 28, respectively, the clutches 25, 27 and 26, 28 being adapted to be alternately closed and opened by shifting member 22 back and forth on shaft 21, in the manner to be hereinafter described in more detail. In the position of Fig. 4 the clutch 25, 27 is closed, and the clutch 26, 28 is open, and it will be understood that by shifting the transmission member 22 longitudinally on shaft 21 the clutch 25, 27 will be opened and the clutch 26, 28 closed.

Around the peripheries of clutch elements 27 and 28 are formed sprocket teeth to provide sprockets 30 for a pair of drive chains 31. These drive chains 31 pass from the top sides of sprockets 30 over sprockets 32 mounted within the side walls 20 at the base of the upwardly extending arm 11, from there down through hollow posts 34 to a pair of sprockets 35 at the upper end of the downwardly extending arm 13, and from there around sprockets 37 back up to the sprockets 30.

The upper sprockets 32 are rotatably mounted on bearings 40 (Fig. 4) carried by a horizontal shaft 41, which shaft is supported between sprockets 32 by a frame part 43. Formed integrally with and inside of each sprocket 32 is a pulley 45, over which runs a belt 46 which extends up through the hollow arm 11 to pass over a pulley 47 on the corresponding reel-carrying spindle 16. The lower sprockets 35 are similarly mounted upon a similar shaft 48, and are provided with pulleys over which pass spring drive belts 50 extending down through the hollow arm 13 to pass over pulleys 51 mounted on the lower reel-carrying spindles 18.

Formed integrally with the upper chain-sprockets 32 and extending outwardly through openings in the side walls 20 of the projector are film sprockets 55, and similarly formed on the lower chain-sprockets 35 are lower film sprockets 56. From the two feed reels 57 and 58 the respective films F and F'' are threaded around their respective sprockets 55, from there are threaded through relatively movable film guides or gates 60 and 61, respectively, and from the lower sides of the gates pass over the respective lower film sprockets 56 to the take-up reels.

The two film gates 60 and 61 are mounted on the outer ends of swinging arms 62 and 63, respectively, the inner ends of which have bearing parts 64 rotatably mounted on vertical pivot pins 65 suitably supported in brackets extending from the opposite sides of the projector frame side walls. Each arm is adapted to swing from an inoperative outside position (see gate 60 in Fig. 4) inwardly through an opening in the side of the projector between the transverse vertical wall 66 and the vertical post 34, to an operative projection position adjacent wall 66 where it is alined with the light aperture (see gate 61 in Fig. 4). For the purpose of swinging the arms, the two arm bearings 64 are provided with spur gears 68 which mesh with a single horizontal rack 70, said rack 70 being manually actuatable to slide longitudinally in bearings 71 in the side walls of the projector and having knobs 72 for convenience in operation. The gears 68 are so arranged with reference to rack 70 that when either of the gates is in the projection position adjacent wall 66 the other is swung out to the inoperative position, and it will be understood that by shifting rack 70 to one side or the other, the two gates will simultaneously be changed between operative and inoperative positions.

To provide sufficient slack in the films that they can thus be moved by the their gates into and out of projection position, a loop 85 is provided in each film between the upper sprocket 55 and the gate, and another loop 86 between the gate and the lower sprocket 56.

Thus the machine is equipped with two sets of film guide means for carrying two film strips to be consecutively projected, each set including the upper and lower film sprockets 55 and 56, respectively, and also the relatively movable guides or gates which are adapted to move the film strips threaded therethrough into and out of alinement with the projection light aperture.

Rack 70 has the additional function of shifting the transmission member 22 to operate the clutches 25, 27 and 26, 28. For this purpose the rack is provided with a shifting fork 90 which engages a groove 91 in the transmission member, and it will be seen that longitudinal movement of the rack from one side to the other opens one clutch and closes the other.

In Fig. 4 the rack is positioned with gate 61 holding its film F'' in the projection position and gate 60 holding its film F in inoperative position, and with clutch 25, 27 closed and clutch 26, 28 open, and it will be understood that the film sprockets and feed and take-up reels for the film F'' are connected through the then closed clutch 25, 27 to the film drive, while the drive means for the other film are disconnected. Upon shifting rack 70 in the direction indicated by the arrow, however, the gate 61 and film F'' are removed from the projection position and replaced by the gate 60 and film F, while at the same time the clutch 25, 27 driving the film F'' is opened and the clutch driving the film F is closed. Thus by this arrangement the operation of positioning either of the films at the projection position causes the corresponding film driving sprockets and reels to be connected to the projector drive for continuous longitudinal movement of that film from the feed reel through the gate to the take-up reel.

A film gate in preferred form is shown in detail in Figs. 7 and 8. The film passes downwardly through a vertical race-way provided between the gate proper and a guide plate 75 fixed to the outer side thereof, guide plate 75 swinging into face-to-face engagement with the wall 66 when the gate is swung to operative projection position, as is gate 61 in Figs. 2, 3 and 4. At the upper end of the gate and guide plate respectively are registering projection apertures 76 and 77, which register with a light or projection aperture 78 in wall 66 when the gate is moved to projection position. Suitable spring pressed guide rollers, such as shown at 79, may be provided for the edge of the film at the projection aperture. The projection aperture is on the center line of a lamp house and condenser lens (not shown) located to the rear thereof, while in front of the projection aperture is the projector lens mount 80. Lens mount 80 is longitudinally slidable within a mounting tube 81 carried between the vertical posts 34 at the front of the projector (see Fig. 5), and is operable therein for a purpose and by means hereinafter to be set forth.

The lower end of the guide plate is provided, over the perforations of the film passing therethrough, with slots 82 through which pass the film moving claw pins 83 of the intermittent film movement, which is generally designated by the numeral 84. Any suitable intermittent film movement may be used, the one here shown for simplicity embodying an oscillating claw arm 85 slidingly pivoted at 86, and actuated by a boxed cam 87, which in turn is driven by a drive shaft 87a. Drive shaft 87a is here conventionally shown driven through a sprocket 87b and chain 87c from a sprocket 87d on the drive shaft 24a of the projector. Backing up the film on the side opposite the film movement is a spring pressed plate 88 having slots 89 to pass the claw pins, this plate normally yieldingly holding the film up to position, but permitting the claw pins to force the film outward until the perforations mesh therewith.

In changing over from one film to the other by operation of rack 70, the intermittent film movement 84 is not stopped, and it is for this reason the gates are mounted to move straight toward and away from the film moving claws during the engagement or disengagement of the films with the claws. By this arrangement the film is simply brought straight toward the claws, and the spring pressed backing-up plate 88 permits the film when first engaged by the pins to be forced back until the pins mesh with the film perforations. And the arrangement is preferably such that in changing gates, the film initially at the projection position is cleared of the claw pins before its driving sprockets are unclutched.

Figure 1:
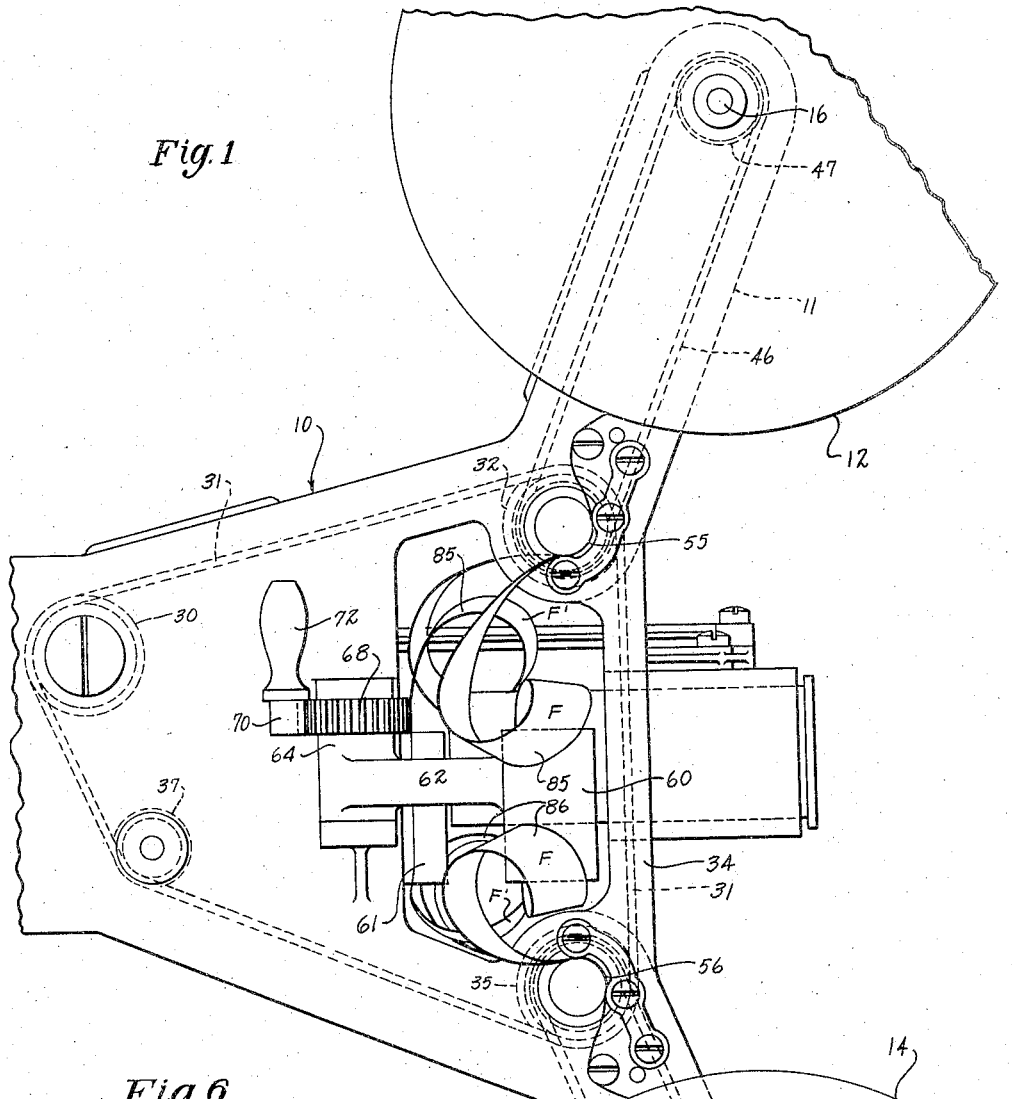
Fig. 1 is a side elevation of a projector according to my invention.
Figure 6:
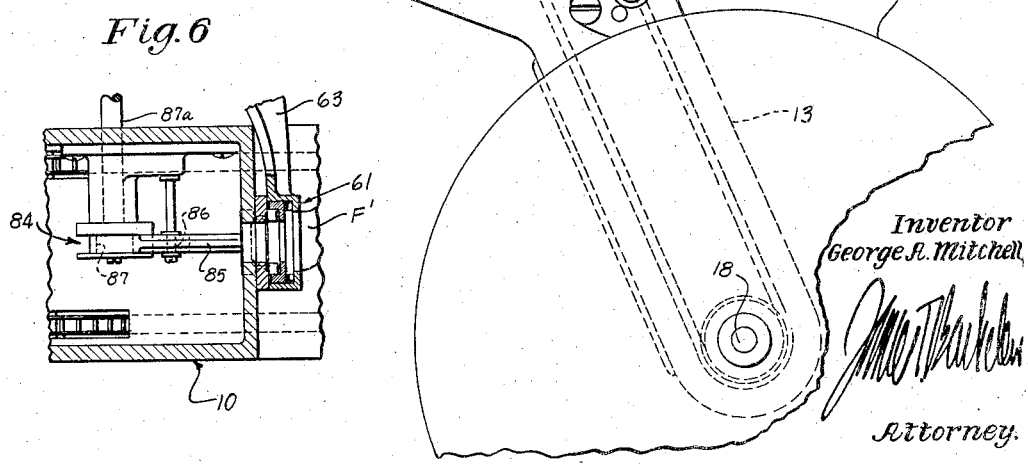
Fig. 6 is a section taken as indicated by the line 6—6 of Fig. 2.

When a short focal length lens is used the lens mount 80 may be so close to the film gate that it will have to be moved each time the film is changed to permit the film gates to clear. Means are therefore preferably provided for automatically moving the lens mount forward to allow the gates to pass as the film is changed, and then returning it to normal position. For this purpose, there may be provided a lens mount operating arm 100 pivoted upon a bracket 101 extending from the projector body, the forward end of which has a slot 102 which takes a stud 103 set into the top of the lens mount and extending upwardly through a slot 105 in the supporting tube 81. The rear end of the arm is connected by means of a link 107 with an arm 108 mounted on a gear 110 which meshes with the gear 64 of gate 61, the arm 108 extending substantially at right angles to link 107 when the link is in its extreme forward or normal position. In the embodiment here shown, gear 110 is one half the diameter of gear 64, so that while the gear 64 rotates through 90 degrees in carrying the film gate 61 from the projection position to the inoperative position, the gear 110 rotates through 180 degrees, and therefore draws the link 107 rearward and then moves it forward again to take the upper dotted line position shown in Figs. 3, 4 and 6. This movement of link 107 operates arm 100 to move the lens mount forward and then rearward as the film gates are changed. When gate 60 is on the projection axis and gate 61 in the inoperative position, the arm 108 and link 107 are in the upper dotted line position of the figures, but the arm 100 is again in position to hold the lens mount in the rearward or projection position, as will be understood without further detailed description.

The complete operation of my projector will now be understood, but a brief summary will here be given. To project a reel of film, the reel is placed on one of the feed reel spindles 16, and the film threaded over the corresponding film sprockets and gate to the take-up reel, the proper loops 85 and 86 being provided, as previously described. The rack 70, which may be considered as an operating member both for the swinging gates and for the clutches between the driving gear and the film sprockets, is then operated to position the gate through which the film has been threaded, in projection position, and this operation also connects the appropriate film driving sprockets and reels with the driving gear. The projector drive may then be started, and the film will be driven by the sprockets, reels and intermittent movement as in the usual manner.

During the projection of this reel, another reel of film may be placed on the other feed reel spindle 16 and threaded around the corresponding film sprockets, which are then stationary, passing through the inoperatively located gate and down to the take-up reel. When the first reel is finished, the rack is actuated to remove it from the projection position and to replace it with the second film, and also to disconnect the drive of the first film and connect the drive of the second, so that projection of the second film is started just as projection of the first film is stopped. And during the change over from one film to the other, the projection lens is moved forwardly to allow the swinging gates to pass, and then returned rearwardly to normal position.

It will be recognized that the illustrative system specifically described herein is capable of considerable modification and rearrangement without departing from the spirit and scope of my invention; and it is therefore to be understood that the following claims embrace all such modifications and equivalent arrangements as may fairly be construed to fall within the scope of my invention.

I claim:—

1. In a motion picture projector, the combination of a single film engaging film movement, film guiding means for a first film adapted to move said first film to and from a position of film engagement by said film movement, and film guiding means for a second film adapted to move said second film to and from a position of film engagement by said film movement.

2. In a motion picture projector, the combination of a single film engaging film movement, film guiding means for a first film adapted to move said first film to and from a position of film engagement by said film movement, film guiding means for a second film adapted to move said second film to and from a position of film engagement by said first movement, and a single operating means oppositely operable upon said film guiding means whereby one film is moved to position for engagement by the film movement while the other film is removed from said position.

3. In a motion picture projector, the combination of a single film engaging intermittent film movement, film guiding means for a first film adapted to move said first film to and from a position of engagement by said intermittent film movement, film guiding means for a second film adapted to move said second film to and from a position of engagement by said intermittent film movement, film moving means for continuously longitudinally moving said first film, film moving means for continuously longitudinally moving said second film, driving means for the projector, and means for connecting said driving means with either of said film moving means.

4. In a motion picture projector, the combination of a single film engaging intermittent film movement, film guiding means for a first film adapted to move said first film to and from a position of engagement by said intermittent film movement, film guiding means for a second film adapted to move said second film to and from a position of engagement by said intermittent film movement, film moving means for continuously longitudinally moving said first film, film moving means for continuously longitudinally moving said second film, driving means for the projector, means for connecting said driving means with either of said film moving means, means adapted to operate oppositely said film guiding means, whereby one film is moved to position for engagement by the intermittent film movement while the other film is removed from said position, and means operatively associated with said last mentioned means automatically operable to cause connection of said projector driving means with the means for continuously longitudinally moving the film engaged at that time by the intermittent film movement.

5. In a motion picture projector, the combination of a frame, a single film engaging intermittent film movement mounted on said frame, and a pair of film gates movably mounted on said frame, each said gate adapted for carrying a film and each movable to and from a position in which the film is engaged by the intermittent film movement.

6. In a motion picture projector, the combination of a frame, a single intermittent film movement mounted on said frame, a pair of film gates mounted on swinging arms pivoted on said frame, each said gate movable by swinging of its arm to carry a film to and from a position to be engaged by the intermittent film movement.

7. In a motion picture projector, the combination of a frame, a single intermittent film movement mounted on said frame, a pair of film gates mounted on swinging arms pivoted on said frame, each said gate having a guide way for a film, and each movable by swinging of its arm to carry its film to and from a position of engagement by the intermittent movement.

8. In a motion picture projector, the combination of a frame, a single intermittent film movement mounted on said frame, a pair of film gates mounted on swinging arms pivoted on said frame, each said gate having a guide way for a film, and each movable by swinging of its arm to carry its film to and from a position of engagement by the intermittent movement, a gear at the pivot of each gate arm, and gear means interconnecting said gears in such relation that operation of the gears causes one gate arm to move its film toward the intermittent movement and the other gate arm to remove its film from the intermittent movement.

9. In a motion picture projector, the combination of a frame, a single intermittent film movement mounted on said frame, a pair of film gates mounted on swinging arms pivoted on said frame, each said gate having a guide way for a film, and each movable by swinging of its arm to carry its film to and from a position of engagement by the intermittent movement, a gear on each gate arm concentric with the pivot thereof, and a manually operable rack meshing with both said gears and longitudinally slidable in the frame, the relation between said gears being such that movement of the rack in one direction causes one gate arm to swing to move its film toward the intermittent movement and the other gate arm to swing to remove its film from the intermittent movement.

10. In a motion picture projector, the combination of a frame, a single intermittent film movement mounted on said frame, a pair of film gates mounted on swinging arms pivoted on said frame, each said gate having a guide way for a film, and each movable by swinging of its arm to carry its film to and from a position of engagement by the intermittent movement, means interconnecting said arms in such relation that as one gate arm moves to carry its film toward the intermittent movement the other gate arm moves to carry its film away from the intermittent movement, means for each film for continuously longitudinally moving that film, driving means for the projector, means for connecting said driving means to either of said means for continuously longitudinally moving the film, and means controlled by the operation of the gate arms for operating said connecting means.

11. In a motion picture projector, the combination of a frame, a single intermittent film movement mounted on said frame, a pair of gates mounted on swinging arms pivoted on said frame, each said gate having a guide way for a film, and each movable by swinging of its arm to carry its film to and from a position of engagement by the intermittent movement, means interconnecting said arms in such relation that as one gate arm moves to carry its film toward the intermittent movement the other gate arm moves to carry its film away from the intermittent movement, means for each film for continuously longitudinally moving that film, driving means for the projector, a pair of clutches one between said driving means and each of said means for continuously longitudinally moving the film, and means controlled by the operation of the gate arms for operating said clutches.

12. In a motion picture projector, the combination of a frame, a single intermittent film movement mounted on said frame, a pair of film gates mounted on swinging arms pivoted on said frame, each said gate having a guide way for a film, and each movable by swinging of its arm to carry its film to and from a position of engagement by the intermittent movement, a gear on each gate arm concentric with the pivot thereof, a manually operable rack meshing with both said gears and longitudinally slidable in the frame, the relation between said gears being such that movement of the rack in one direction causes one gate arm to swing to move its film toward the intermittent movement and the other gate arm to swing to remove its film from the intermittent movement, means for each film for continuously longitudinally moving that film, driving means for the projector, a pair of clutches one between said driving means and each of said means for continuously longitudinally moving the film, and means controlled by the said rack for operating said clutches.

13. In a motion picture projector, the combination of a frame, a single intermittent film movement mounted on said frame, a pair of film gates mounted on swinging arms pivoted on said frame, each said gate having a guide way for a film, and each gate arm movable on its pivot forwardly to carry its film from a position of engagement by the intermittent movement to an inoperative position, means interconnecting said gate arms and operable to move one gate toward the intermittent movement as it moves the other away from the intermittent movement, said gates having projection apertures, a lens mount movably mounted in the frame and normally located in front of the aperture of the gate positioned at the intermittent movement, and means actuated by virtue of exchanging gates at the intermittent movement for removing the lens mount from its normal position and then returning it, to allow the swinging gates to clear said lens mount during the exchange.

14. In a motion picture projector, the combination of a frame, a single intermittent film movement mounted on said frame, a pair of film gates mounted on swinging arms pivoted on said frame, each said gate having a guide way for a film, and each gate arm movable on its pivot forwardly to carry its film from a position of engagement by the intermittent movement to an inoperative position, a gear on each gate arm concentric with the pivot thereof, gear means interconnecting said gears and operable to move one gate arm toward the intermittent movement as the other gate arm is removed from the intermittent movement, said gates having projection apertures, a lens mount longitudinally movable in the frame on the center line of the projection aperture and located forwardly of said aperture, a gear meshing with one of the gate arm interconnecting gears, and means interconnecting said last mentioned gear and said lens mount and adapted to move the lens mount forwardly from normal position and then return it during operation of the gears to exchange gates at the intermittent movement.

15. In a motion picture apparatus, the combination of an aperture plate before which a film is adapted to be moved, a lens mount mounted on the apparatus forwardly of said aperture plate and movable towards and away from said aperture plate, a film gate pivoted on the apparatus on an axis to one side of the aperture in the aperture plate so as to swing to a position adjacent the forward face of said aperture plate, and to swing from said position forwardly towards said lens mount, and a lens mount shifting linkage operatively associated with said pivoted gate and connected to the lens mount, said linkage arranged to move the lens mount forwardly from the aperture plate during and by virtue of the movement of the gate forwardly from said aperture plate.

16. In combination, a motion picture apparatus having a single light aperture, film engaging film movement mechanism adapted to move a film past the light aperture, and two film carrying gates mounted on the apparatus and cooperatively shiftable thereon to move their respective films alternately into and out of cooperative engagement with said film movement mechanism.

17. In combination, a motion picture apparatus having a single light aperture, and two film gates each pivoted on said apparatus to move into and out of registration with said light aperture, a lens mount mounted in said apparatus to move towards and away from said light aperture, and lens mount shifting means operated by the shifting of said gates for moving the lens mount away from and then back towards said light aperture during exchanging of gates at the light aperture.

18. In combination, a motion picture apparatus having a single light aperture, and two film gates each pivoted on said apparatus to move into and out of registration with said light aperture, means operatively interconnecting said gates in such relation that one of the gates is removed from registration with the aperture as the other gate is moved thereto, a lens mount mounted in said apparatus to move towards and away from said light aperture, and lens mount shifting means operated by the shifting of said gates for moving the lens mount away from and then back towards said light aperture during exchanging of gates at the light aperture.

19. In combination, a motion picture apparatus having a frame, means on said frame providing a single light aperture before which a film strip may be moved, two sets of film guide means on said frame for carrying two film strips, and a film guide in each of said guide means sets relatively shiftable within its set to flex and carry the intermediate portion only of a film strip threaded on that set between positions in and out of optical alinement with said light aperture.

20. In combination, a motion picture apparatus having a frame, means on said frame providing a single light aperture before which a film strip may be moved, two sets of film guide means on said frame for carrying two film strips in spaced paths along opposite sides of said light aperture, and a film guide in each of said guide means sets relatively shiftable within its set to flex and carry the intermediate portion only of a film strip threaded on that set between positions in and out of optical alinement with said light aperture.

21. In combination, a motion picture apparatus having a frame, means on said frame providing a single light aperture before which a film strip may be moved, an intermittent film movement mechanism mounted on said frame to engage and move a film past said light aperture, two sets of film guide means on said frame for carrying two film strips, and a relatively movable film guide in each of said guide means sets for moving the intermediate portion of a film strip threaded on that set between a position in optical alinement with said light aperture and of engagement by said film movement mechanism, and a position out of optical alinement with said aperture and free of the film movement mechanism.

22. In combination, a motion picture apparatus having a frame, means on said frame providing a single light aperture before which a film strip may be moved, a pair of film drive sprockets mounted on said frame above said aperture and located on opposite sides thereof, a corresponding pair of film drive sprockets mounted on said frame below said aperture and on opposite sides thereof, said lower sprockets adapted to take film strips fed downwardly by said upper sprockets, a pair of movable film guides on the frame taking the intermediate portions of the film strips between the upper and lower sprockets, said film guides movable relatively to said sprockets to flex and carry the intermediate film portions passing therethrough alternately into and out of a position of optical alinement with said light aperture, an intermittent film movement mechanism mounted on the frame to be engaged by the film strip moved into alinement with the light aperture, and means for selectively driving that pair of upper and lower sprockets that corresponds to the movable film guide then standing in alinement with the light aperture.

23. In combination, a motion picture apparatus having a frame, means on said frame providing a single light aperture before which a film strip may be moved, a pair of film drive sprockets mounted on said frame above said aperture and located on opposite sides thereof, a corresponding pair of film drive sprockets mounted on said frame below said aperture and on opposite sides thereof, a pair of film gates adapted to take and guide vertically moving film strips, said gates vertically pivoted on said frame on opposite sides of said aperture so as to horizontally carry film strips passing therethrough from a position of alinement with said aperture to positions on opposite sides thereof, all in such manner that film strips fed downwardly from said upper sprockets may be formed in loops to pass through said film gates and then pass on to said lower sprockets, an intermittent film movement mechanism mounted on the frame to be engaged by the film strip moved into alinement with the light aperture by its film gate, and means for selectively driving that pair of upper and lower sprockets that corresponds to the gate then standing in alinement with the light aperture.

GEORGE A. MITCHELL.